May 22, 1962  C. W. PETERSON  3,035,501
VIEW FINDERS FOR CAMERAS
Filed Jan. 22, 1957
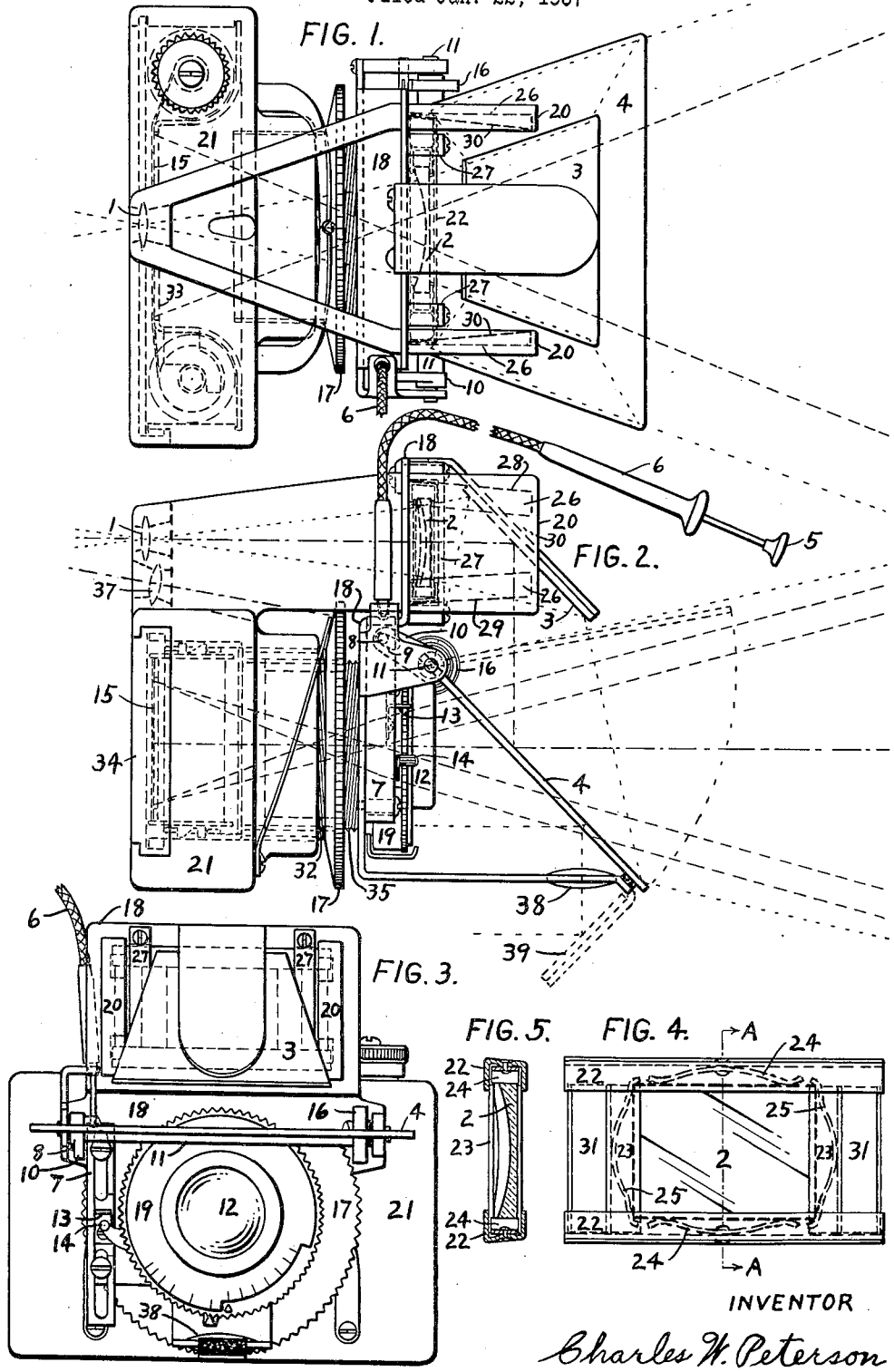
INVENTOR
Charles W. Peterson United States Patent Office 3,035,501
Patented May 22, 1962

3,035,501
VIEW FINDERS FOR CAMERAS
Charles W. Peterson, 43 Edgerton St., Rochester, N.Y.
Filed Jan. 22, 1957, Ser. No. 635,477
3 Claims. (Cl. 95—44)

The objects of my improvement are, first, to provide a viewfinder with zero parallax without the light seal difficulties encountered when viewing through the taking lens of the camera; and secondly, to provide an eye level viewfinder which shows accurately the area being photographed, for a very wide range of object distances.

In my Patent No. 2,187,093, January 16, 1940, on a camera, I showed a viewfinder which corrected for parallax, but in practice, when using lenses in the view finder, did not show very accurately the area being photographed, for a wide range of object distances. When constructed to show accurately the coverage area of distant objects, it showed more than was covered at short distances. Also, the fact that the viewfinder looked at the object from a slightly different angle of view than the taking lens, proved a series handicap when trying to photograph certain types of close objects.

To accomplish the first object, that of eliminating parallax, I place a periscope composed of two mirrors, in front of the viewfinder, to shift its line of sight to coincide with that of the taking lens. Then when taking a picture, the first movement of the cable release turns one mirror out of the line of sight of the taking lens before the shutter is tripped. Besides eliminating parallax, the problem of different angles of view for viewfinder and taking lens is of course also eliminated.

To accomplish the second object, that of compensating for the error in viewfinder area coverage inherent in this inverted Galilean telescope type view finder having a positive eye lens and negative field lens, I provide the field lens with a rectangular mask with four movable sides and means by which these sides are moved inwardly slightly as the camera lens is focused for closer objects.

The means by which I accomplish these objects is clearly shown in the accompanying drawings. I have shown the viewfinder attached to the same type of right and left hand threaded focusing tube camera with my spiral focusing scale, shown in my said Patent No. 2,187,093.

In the drawings, FIG. 1 is a top view of my camera and viewfinder focused to infinity; FIG. 2, a side view of the same; FIG. 3, a front view with the cable release pressed just enough so that the large mirror points straight forward to let the shutter be seen; FIG. 4, a front view of the viewfinder negative lens and movable mask assembly removed from the camera; and FIG. 5, a vertical section of the same at A—A, FIG. 4. Similar numerals refer to similar parts throughout the several views.

The drawings are full scale of a #828 camera with a lens of 50 mm. focal length, for making 2" x 2" color slides with a picture size 26 mm. x 38 mm. The focusing range of this camera is from infinity to 8". The viewfinder mirrors and lenses shown are of a size and shape to conserve all the light rays from the object within an angle of view very slightly less than that of the taking lens, for safety, and to give a brilliant view of the object.

The construction and operation may be most easily understood by referring to FIG. 2, in which dashed lines represent the central and full aperture rays from the edges of an object at infinite distance and dotted lines, the central rays through the viewfinder for these object edges. The path of a ray through the viewfinder from the center of the object is shown as a dot dash centerline, and it may be seen that it coincides with the centerline of the taking lens.

The optics of the viewfinder comprises convex eye lens 1, concave field lens 2, small mirror 3, and movable mirror 4.

Pressing plunger 5 of cable release 6 shoves sliding bar 7 downward. Pin 8 on this bar is in slot 9 of crank 10 of mirror shaft 11 and imparts to it a counter clockwise rotation, rotating mirror 4 upward out of the field of view of taking lens 12, as dotted in. Bracket 13 on sliding bar 7 is adjusted by means of its slot and screw so that it trips shutter release 14 at the instant mirror 4 is out of the field of view of taking lens 12, exposing film 15. Releasing the finger pressure on plunger 5 of the cable release lets mirror 4 return downward to its viewfinder position because of the torque of mirror shaft spiral clockspring 16, which force, by means of a crank 10, raises sliding bar 7 to its original position.

The second, or view area correction, feature of my viewfinder comes into action when the camera is focused to close object distances. This is done by turning knurled focusing flange 17, which moves taking lens 12 further from film 15 also concave viewfinder field lens 2 forward an equal distance. The connection which moves this viewfinder lens is camera front plate 18, in which the "between the lens shutter" 19 is mounted. The upper part of this plate 18 has two rectangular clearance holes for the two viewfinder guides 20, 20 which project forward from camera body 21, and a horizontal rectangular hole to see through. Besides being viewfinder guides, these projections 20, 20, keep camera front plate 18 from rotating when focusing flange 17 is turned, but allow the free forward and backward motion of plate 18 to cover the full focusing range of the camera.

My novel mounting of the viewfinder field lens 2 is best seen in FIGS. 4 and 5, where it is shown separate from the camera and is enlarged to 1½ scale. Rectangular negative field lens 2 is held centered in a rectangular frame of four channel members 22, 22 and 23, 23 which form the adjustable mask, by four spring members 24, 24 and 25, 25. These springs are made of strip stock and the opposing springs, being of equal strength, hold lens 2 central for the range of different separations of the frame channels required to change the mask size from that for infinity focus to the smaller size required for an object distance of 8" from the taking lens.

The ends of horizontal channels 22, 22 are confined in guide slots 26, 26 in viewfinder guides 20, 20 and between plate 18 and channel retainer straps 27, 27. The guide slot upper surfaces 28 slope downhill and the lower surfaces 29, uphill the proper amount to bring the horizontal channels 22, 22 closer together by the required amount to reduce the vertical dimension of the viewfinder field lens mask to make the necessary view coverage correction for each closer object distance, as front plate 18 is moved forward for focusing.

This movement also similarly reduces the horizontal dimension between viewfinder mask channels 23, 23 because of sloped center parts 30, 30 of projections 20, 20 FIG. 1, which converge slightly toward the front as shown by dashed lines. Since sloped center 30, 30 are too far apart to press directly against the vertical channels 23, 23, spacer blocks 31, 31 are introduced to ride the slopes 30, 30 and transmit this narrowing motion to the field lens mask sides 23, 23 as the camera is focused for shorter object distances.

While the objects of my present improvements concern the viewfinder, nevertheless their embodiment in a camera which is practical and has a low manufacturing cost has inspired the novel design shown. Minute details of the same will not be gone into here but suffice to say, the body 21, including viewfinder guides 20, 20 is moulded of phenolic plastic in two halves to the sides of a vertical plane through the viewfinder eye lens mount and threaded hole for the focusing tube 32, which halves are cemented together after inserting the eye lenses, using a very strong permanent cement such a Cycleweld. After cementing, the threads of the hole for focusing tube 32 are cleaned up to the exact size required by running in a standard tap. The viewfinder guide slopes 28, 29, and 30 come in finished condition right off the moulds. The film aperture plate 33, with its spool supports, shown in dashed lines in FIG. 1, is of sheet metal and is held solidly in body 21. The camera back 34 holds a film pressure plate not shown, and slides out of light tight grooves moulded in body 21, when film is to be loaded or unloaded.

Left hand threaded small focusing tube 35 screws inside of right hand threaded large focusing tube 32 and is secured solidly to camera front plate 18 by the internally threaded retainer ring of shutter 19.

Two features are shown which, although not necessarily part of this camera, make it ideal for use by older people who have lost their eye accommodation for near by objects, and do not use bi-focal glasses or wish to use reading glasses or a magnifying glass when adjusting the camera settings. These are magnifying lens 37 shown just below viewfinder eye lens 1, in FIG. 2, and magnifying lens 38 at the bottom. Lens 37 enables the operator to see, magnified, the focusing scale on the back of focusing flange 17, with his eye still at the viewfinder. Lens 38, due to reflection by the back side of 45 degree mirror 4, enables the operator to see and adjust the thus magnified lens diaphragm and shutter speed settings with his eye at the side, instead of looking at the shutter from the front. If it is desired to make these shutter adjustments still easier, small 45 degree mirror 39, shown dotted in FIG. 2, can be added. This enables the operator to see all of the settings, magnified, from the back of the camera. This feature is particularly useful, for instance, when making tripod held camera close ups of flowers among closely packed limbs of a tree, which limbs prevent the operator from getting his head around to the front of the camera.

Not shown because it would unnecessarily complicate the drawings, but particularly necessary for this camera and viewfinder system, is the leather carrying case to protect the mirrors and keep out dust. An attached cover and flaps are provided for full operation of the camera without removing the case. Attached in the carrying case is a small spring wound tape measure, the end of which the operator may pull out to reach the object for accurately reading its distance from the camera.

No attempt has been made to keep this camera and viewfinder system small or light, as it has been found in 2" x 2" slide cameras for serious amateur and professional work, the heavier the camera, the sharper the pictures from hand held shots.

Fitting names for a camera with these viewfinder and other improvements would be "Naturalist's Camera" or "Medical-Dental Camera." In close up shots in these fields it is particularly necessary that both the viewfinder and taking lens see the object from the same angle of view. For instance, with an ordinary two lens reflex camera, a picture of a flower may show a limb in front of it that did not show in the viewfinder, or a dentist may not get a picture of the tooth he wanted because of other teeth or lips in the way, which did not show in the viewfinder. A camera with my improved viewfinder is free from these troubles.

I claim:

1. In combination with a camera having a taking lens movable to focus an object onto the film, a viewfinder comprising a convex eye lens, a concave movable field lens, a mask with four independently movable sides adjacent the field lens, a guide means for each of said four sides of said mask fixedly attached to said camera, mounting mean for holding both said taking lens and said field lens to simultaneously move both said lenses when the camera is being focused, each of said of said guide means having an inclined surface structure respectively coacting with its side of said mask to cause it to move laterally as said mounting is moved, whereby focusing of said camera also focuses said finder field lens and causes said four sides of said mask to be adjusted by their respective guide means.

2. In combination with a camera having a taking lens movable to different focusing positions, an inverted Galilean telescope type viewfinder having a field lens mechanically connected to said taking lens of the camera, a field mask including four laterally movable sides mounted on the field lens, a four sided guide member attached to said camera with said guide member having its sides slightly converging for moving said sides of said mask inwardly as said taking lens and said field lens are jointly moved to positions for focusing on closer objects, whereby said mechanical connection between the field mask sides and their respective guide surfaces is effective to vary the size of the field mask so that the viewfinder shows accurately the taking lens coverage for every object distance to which the camera is focused.

3. In a camera having a taking lens mounted on an axially movable focusing front plate and an inverted Galilean telescope type viewfinder with its field lens also mounted on said front plate, but with externally controlled lateral freedom of motion, a field mask with four separately movable sides on the field lens, springs between the mask sides and the field lens to hold said lens essentially centralized in said mask and exerting outward force on the mask sides, a stationary four sided mask confining guide which varies in size with axial length surrounding the mask and lens to control the lateral positions of said mask sides and said field lens so that the viewfinder shows the same area of coverage as the taking lens for each distance to which the camera is focused.

References Cited in the file of this patent

UNITED STATES PATENTS

| | | |
|---|---|---|
| 1,261,643 | Stout | Apr. 2, 1918 |
| 1,789,289 | Azarraga | Jan. 20, 1931 |
| 2,030,778 | Armstrong | Feb. 11, 1936 |
| 2,048,773 | Baumgartner | July 28, 1936 |
| 2,211,995 | Walker | Aug. 20, 1940 |
| 2,219,314 | Hoch | Oct. 29, 1940 |
| 2,284,757 | Morton | June 2, 1942 |
| 2,364,413 | Wittel | Dec. 5, 1944 |
| 2,552,244 | White | May 8, 1951 |
| 2,737,844 | Jerome et al. | Mar. 13, 1956 |
| 2,805,608 | Leitz et al. | Sept. 10, 1957 |